(12) United States Patent
Hughes et al.

(10) Patent No.: US 11,433,458 B2
(45) Date of Patent: Sep. 6, 2022

(54) GAS DELIVERY AND PURGING DEVICE FOR ADDITIVE MANUFACTURING CHAMBER AND METHOD OF USING SAME

(71) Applicants: Russell V. Hughes, Plymouth, MI (US); Joseph Pavilanis, Romulus, MI (US)

(72) Inventors: Russell V. Hughes, Plymouth, MI (US); Joseph Pavilanis, Romulus, MI (US)

( * ) Notice: Subject to any disclaimer, the term of this patent is extended or adjusted under 35 U.S.C. 154(b) by 234 days.

(21) Appl. No.: 15/930,603

(22) Filed: May 13, 2020

(65) Prior Publication Data
US 2020/0360994 A1 Nov. 19, 2020

Related U.S. Application Data

(60) Provisional application No. 62/846,955, filed on May 13, 2019.

(51) Int. Cl.
*B22F 12/00* (2021.01)
*B33Y 40/00* (2020.01)
(Continued)

(52) U.S. Cl.
CPC ............ *B22F 12/00* (2021.01); *B22F 10/322* (2021.01); *B22F 12/70* (2021.01); *B33Y 30/00* (2014.12); *B33Y 40/00* (2014.12); *B22F 10/10* (2021.01)

(58) Field of Classification Search
CPC ...... B22F 3/00; B22F 3/10; B22F 7/00; B22F 10/10; B22F 10/322; B22F 12/70;
(Continued)

(56) References Cited

U.S. PATENT DOCUMENTS 2,602,959 A * 7/1952 Fenlin .................... B29D 23/00
118/123
6,148,761 A * 11/2000 Majewski ......... C23C 16/45565
118/715
(Continued)

FOREIGN PATENT DOCUMENTS

CN 110883410 A 3/2020
DE 10 2017 218 926 A1 4/2019
(Continued)

OTHER PUBLICATIONS

Form PCT/ISA/210 from International Application PCT/US2020/032610, of which this application is a priority of.
(Continued)

*Primary Examiner* — Matthew W Jellett
(74) *Attorney, Agent, or Firm* — Carrier Blackman & Associates, P.C.; Joseph P. Carrier; Jeffrey T. Gedeon

(57) ABSTRACT

A gas delivery and purging device for an additive manufacturing chamber includes at least one flexible gas tube having a gas inlet, a purging gas outlet, and a sidewall which defines a shape of the tube, and a source of purging gas operatively connected to the at least one flexible purging gas tube for selectively delivering the purging gas to the at least one flexible purging gas tube. The gas outlet includes pores defined in substantially an entire surface area of the sidewall such that the purging gas passes through the pores and is thereby released into the chamber and is suitable for delivering a large volume of purging gas in a laminar flow.

16 Claims, 6 Drawing Sheets

(51) Int. Cl.
B33Y 30/00 (2015.01)
B22F 12/70 (2021.01)
B22F 10/322 (2021.01)
B22F 10/10 (2021.01)

(58) Field of Classification Search
CPC ......... B33Y 10/00; B33Y 40/00; B29C 64/10; B29C 64/371; Y02P 10/25
See application file for complete search history.

(56) References Cited

U.S. PATENT DOCUMENTS

| | | | | |
|---|---|---|---|---|
| 7,166,148 B2* | 1/2007 | Lyons | ................ | B01D 67/0088 427/407.1 |
| 8,373,092 B2* | 2/2013 | Dietrich | .................. | B29C 64/25 219/121.85 |
| 2013/0098974 A1 | 4/2013 | Dong et al. | | |
| 2013/0233318 A1 | 9/2013 | Graham et al. | | |
| 2015/0209885 A1 | 7/2015 | Zhang et al. | | |
| 2017/0144223 A1 | 5/2017 | Gold et al. | | |
| 2017/0274589 A1 | 9/2017 | Wu et al. | | |
| 2018/0244034 A1 | 8/2018 | Sutcliffe et al. | | |
| 2018/0345573 A1 | 12/2018 | Zinniel et al. | | |
| 2019/0099943 A1 | 4/2019 | Connell | | |

FOREIGN PATENT DOCUMENTS

| | | |
|---|---|---|
| EP | 3 321 003 A1 | 5/2018 |
| WO | 2017/013454 A2 | 1/2017 |
| WO | 2019/088105 A1 | 5/2019 |
| WO | 2020/093038 A1 | 5/2020 |

OTHER PUBLICATIONS

Examination Report dated Jul. 12, 2022 issued in the corresponding British Patent Application No. GB2115990.0.
Office Action dated Jun. 27, 2022 issued in the corresponding Austrian Patent Application No. A9164/2020.

* cited by examiner

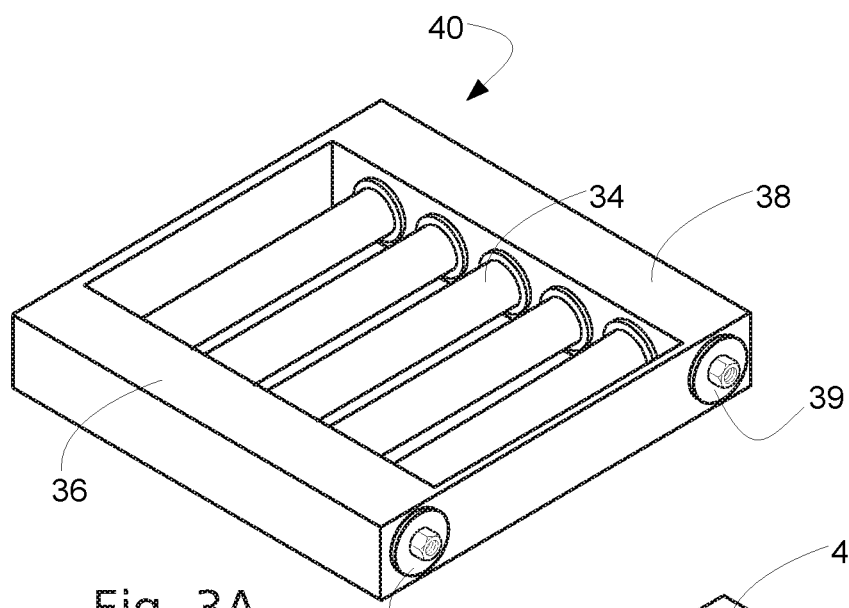
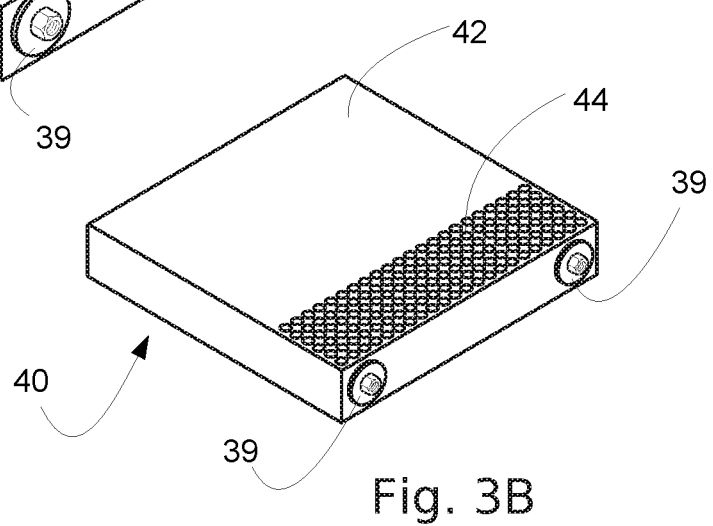

GAS DELIVERY AND PURGING DEVICE FOR ADDITIVE MANUFACTURING CHAMBER AND METHOD OF USING SAME

CROSS-REFERENCE TO RELATED APPLICATIONS

The present application claims priority under 35 USC § 119 to U.S. Provisional Patent Application No. 62/846,955, filed on May 13, 2019. The entire subject matter of this priority document, including specification, claims and drawings thereof, is incorporated by reference herein.

BACKGROUND OF THE INVENTION

1. Field of the Invention

The technique of additive manufacturing creates metal parts from individual layers of metal stacked on top of each other. A first layer is deposited on a base and each additional layer is deposited on the previous layer in varying shapes and layouts to form a three dimensional metal part. This additive manufacturing process must occur in an environment that is non-reactive and non-contaminating to the part being fabricated. For example, a chamber in which the additive manufacturing process occurs may initially be purged of undesirable gases including air by being filled with a non-reactive or inert gas such as argon in a manner whereby the argon displaces all the other gases in the chamber down to negligible amounts, after which a much smaller amount of argon is then continuously fed into and flows through the chamber throughout the additive manufacturing process. Further discussion herein refers to argon as the desired gas, but it will be understood that other non-reactive or insert gases maybe appropriate for use according to the present invention.

2. Background Art

Conventionally, purging gas such as argon, which is heavier than air, is introduced near a bottom of the processing chamber and then rises upward to displace the other gases in the chamber toward and out of vents at the top of the chamber, after which a smaller amount of the purging gas is continuously flowed through the chamber throughout the additive manufacturing process. Various devices and techniques for purging an additive manufacturing chamber with argon have been conventionally used and attempted. These past uses and attempts have different considerations for their use, such as the amount of argon gas needed for a given chamber volume, the input pressure needed for the argon gas, the rate at which the argon is introduced into the chamber, and the speed at which the chamber can be purged. An important factor for the amount of argon gas needed relates to the degree of turbulence caused by the introduction of the argon gas. Turbulence caused from the introduction of argon gas causes the argon to mix with the undesirable gases. This mixing will undesirably increase the amount of argon gas needed and the time required to sufficiently purge the chamber, whereby it is desired that the argon gas be introduced and filled into the chamber in as laminar a manner as possible.

Conventional and past attempts at gas delivery and purging devices for an additive manufacturing chamber include: rigid pipe work with drilled outlet holes facing downward toward a basal surface; sintered metal sheets or plates, e.g., made of bronze, under which gas is initially disbursed through a substrate of steel wool and then passes upward though the sintered sheets/plates, or sintered metal parts having a roughly cylindrical or conical shape, such as pneumatic mufflers formed of sintered bronze which are relatively small in size, e.g., ½-¾ inch diameter×1-2 inch length, and with a small number, e.g., 10-20, of the mufflers connected together in series with a common gas feed tube or manifold; and disk-shaped sintered metal sheets. These past uses and attempts represent the state of the art, but have limited suitability for their intended purpose. For example, a rigid pipe with drilled holes can allow for a greater than desired amount of turbulence, while sintered metal parts require a pressure of input argon gas that is relatively high and can have a much slower purging time, etc.

In these past uses and attempts, the actual outlet area for delivering the purging gas is small compared to the area of the chamber base. Such a relatively small outlet area for the purging gas causes excessive mixing and turbulence increasing the amount of purging gas needed. Lowering the input pressure of the purging gas can reduce turbulence and mixing, but has the negative outcome of increasing the time required to purge the chamber, whereby it is conventionally necessary to strike a balance between appropriate input pressure and appropriate purging time. For example, a one $m^3$ chamber purged with argon could take over one hour to reach an acceptable gas purity level with contaminant gases like oxygen and nitrogen constituting less than 50 ppm and could require purging gas amounts of between five and ten times the volume of the chamber. Accordingly, there is a need in the art for an improved gas delivery and purging delivery device for additive manufacturing chambers which can reduce purge times while also minimizing the amount of gas required for sufficiently purging undesirable gases from the chamber, as well as a method of using the device.

SUMMARY OF THE INVENTION

A first aspect of this disclosure provides a gas delivery and purging device for an additive manufacturing chamber. The gas delivery and purging device includes at least one flexible purging gas tube having a purging gas inlet, a purging gas outlet, and a sidewall which defines a shape of the tube, and a source of purging gas operatively connected to the at least one flexible purging gas tube for selectively delivering the purging gas to the at least one flexible purging gas tube. The purging gas outlet includes pores defined in substantially an entire surface area of the sidewall such that the purging gas passes through the pores into the chamber.

In a second aspect of this disclosure, the pores of the sidewall of the purging gas tube are arranged in an open cell configuration. This open cell configuration allows for the escape of purging gas across the entire sidewall surface area.

In a third aspect of this disclosure, the purging gas tube is a flexible polymer based tube.

In a fourth aspect of this disclosure, the purging gas tube is a soaker hose of the type originally designed to deliver water in horticultural operations.

In a fifth aspect of this disclosure, the purging gas tube includes a plurality of sections connected together with an inlet manifold.

In a sixth aspect of this disclosure together with the fifth aspect, the plurality of tube sections are arranged substantially parallel to each other and disposed along a base surface of the additive manufacturing chamber.

In a seventh aspect of this disclosure together with the fifth aspect, the plurality of tube sections are arranged in a vertically stacked configuration.

In an eight aspect of this disclosure together with the fifth aspect, the plurality of tube sections are further connected together with an outlet manifold. The inlet and outlet manifolds are configured to connect with inlet and outlet manifolds of an adjacently provided gas purging devices.

In a ninth aspect of this disclosure, the purging gas tube is disposed in a coiled shape.

A tenth aspect of this disclosure provides a method of delivering purging undesired gasses from an additive manufacturing chamber, including steps of providing at least one flexible purging gas tube having a purging gas inlet, a purging gas outlet, and a sidewall which defines a shape of the tube within an additive manufacturing chamber, and supplying a purging gas into the additive manufacturing chamber through the at least one flexible purging gas tube such that the purging gas displaces other gasses within the chamber and forces the other gasses out of the chamber. The purging gas outlet includes pores defined in substantially an entire surface area of the sidewall such that the purging gas passes through the pores into the chamber.

In an eleventh aspect of this disclosure, in the step of supplying a purging gas into the additive manufacturing chamber through the at least one flexible purging gas tube, the purging gas flows into the chamber in laminar flow or substantially laminar flow.

For more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF DRAWINGS

FIG. 3A is a perspective view of a gas delivery and purging device provided in a modular unit shape which may be assembled with other modular units according to an exemplary embodiment of the present invention.

FIG. 3B is a perspective view of the modular unit shaped gas delivery and purging device of Fig. FIG. 3A provided together with a protective cover plate having numerous holes defined therethrough.

DETAILED DESCRIPTION

Figure 1:
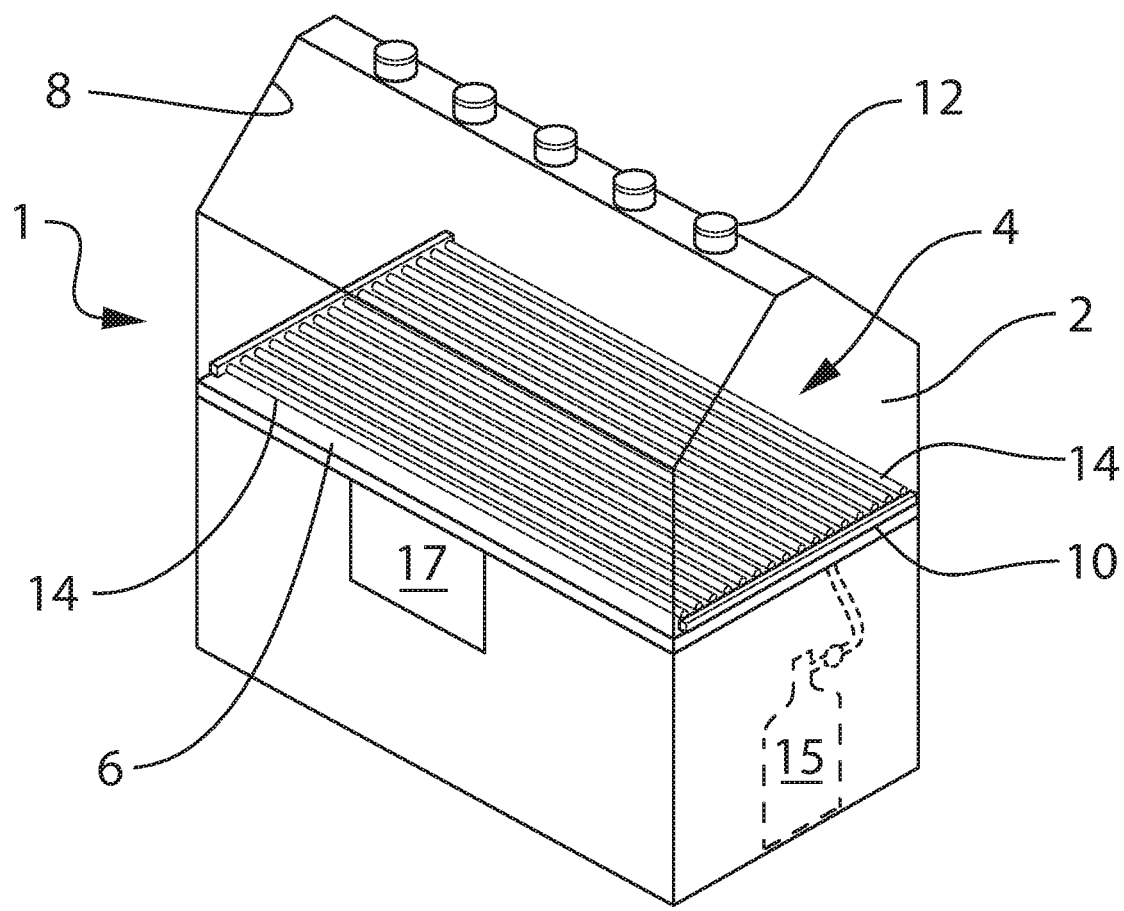
FIG. 1 is a perspective view of an idealized additive manufacturing chamber having a gas delivery and purging device according to an exemplary embodiment of the present invention.
Figure 2:
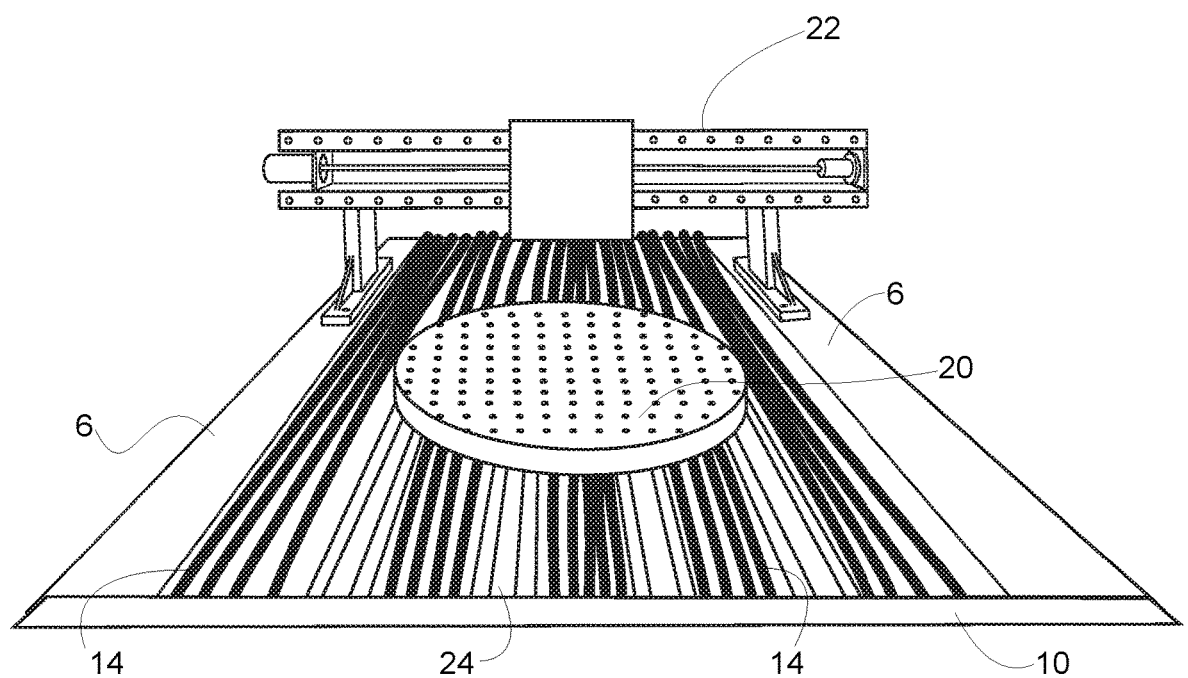
FIG. 2 is partial perspective view of an additive manufacturing chamber having a gas delivery and purging device fit around other components of the manufacturing chamber according to another exemplary embodiment of the present invention.

With reference to FIGS. 1 and 2, there is generally shown an additive manufacturing device 1 having a processing chamber 2 and a gas delivery and purging device 4, although the operative components required for the additive manufacturing, including a support table and gurney, are omitted for ease of understanding the structure of the gas delivery and purging device 4. The processing chamber 2 includes a base support 6 and a hood 8 enclosing an additive manufacturing chamber. The chamber houses the gas delivery and purging device 4, together with the operative components required for the additive manufacturing which, again, are not shown. The chamber includes one or more gas inlets 10, which may be a manifold, associated with the gas delivery and purging device 4 to allow for the transmission of purging gas into the chamber via the gas delivery and purging device 4 and one or more gas outlet vents 12 to allow for purged gas to be vented out of the chamber. The gas outlet vents 12 can be one or more vents that permit air and other undesired gases that have been displaced by the purging gas to be discharged out of the chamber. The outlet vents 12 may contain valves that can be closed or partly closed once the chamber is purged of air in order to maintain the integrity of the purge gas environment.

A source of the purging gas 15 may be provided in association with the gas delivery and purging device 4 and connected in fluid communication with the gas inlets 10. The purging gas source 15 may be pressurized and include an open/close valve, a regulator, etc. so that the purging gas may be delivered to the gas inlet(s) 10 at various pressures or flow rates, as may be desired for various purging operations, and the purging gas source 15 may be disposed within a base of the additive manufacturing device 1 or other appropriate location. Sensor(s) (not shown) for determining the purge gas concentration and/or the concentration of contaminant gases may be provided with the vents or elsewhere in the chamber 2, and a control unit such as a central processing unit (CPU) 17 may be provided which receives inputs from the sensors and is programmed to control the flow of the purging gas into the processing chamber, as well as to control the valves of the outlet vents 12 and other aspects of the gas delivery and purging device 4.

The gas delivery and purging device 4 includes at least one flexible tube 14. The tube 14 has a gas inlet, which may be at one or both ends thereof, a gas outlet in the form of numerous small pores 16 provided on the entire surface area of a sidewall that defines the flexible tube. The flexible tube 14 may have a closed end, e.g., an end cap, on the end of the tube opposite the gas inlet. Again, the gas outlet includes numerous pores 16 arranged over the entire surface area of the sidewall. The pores 16 of the sidewall may be very small, e.g., less than one mm, such that the pores are not very visible to the naked eye, but are shown with an exaggerated size in FIG. 5 for ease of understanding. Further, the pores 16 may be linked in a so-called open cell configuration or structure of a polymeric material forming the tube. This open cell configuration includes many pores in every $cm^3$ of the sidewall and allows for the escape of the purging gas from virtually the entire surface area of the sidewall of the flexible gas tube 14. Very importantly, the gas as delivered through the pores 16 flows into the chamber in a very laminar, non-turbulent manner. The tubing used to form the tubes 14 is typically a flexible rubber-like or polymer based tube. One exemplary gas tubing which works very well according to the present invention is a gardening soaker hose of the type designed to deliver water in horticultural operations, and is economical to manufacture and form into any desired configuration or arrangement for gas delivery within the chamber 2.

In the exemplary embodiment of the gas delivery and purging device 4, multiple purging gas tubes 14 are provided in any desired arrangement within the additive manufacturing chamber. These multiple gas tubes 14 each have the same open cell porous sidewall configuration and are connected together with an inlet manifold 10. The ends of these multiple purging gas tubes may include respective end caps or an end cap manifold. When using multiple purging gas tubes 14, the tubes may be arranged in various configurations to meet the constraints of the additive manufacturing chamber, e.g., they cannot interfere with the operative components of the additive manufacturing or with movements thereof.

The flexible nature of the gas tubes allows the tubes to be provided in essentially any desired configuration or arrangement within the chamber 2. FIG. 1 depicts an idealized arrangement in which the multiple purging gas tubes 14 are arranges substantially parallel to each other along a base surface of the chamber. Because of the open cell configuration of the sidewall of the gas tube, a parallel arrangement of multiple gas tubes can provide a gas release along a surface area that is significantly greater than the surface area of the base surface of the chamber. For example, a base surface of the chamber could have the dimensions of 1 meter by 2 meters providing a surface area of two (2) m². Using thirteen (13) of the parallel gas purging tubes 14 with a twenty five (25) mm diameter, which corresponds to roughly seventy eight (78) mm circumference, cut to a length of two (2) meters would provide a total porous sidewall surface area exceeding the two (2) m² size of the base surface of the chamber. However, these thirteen parallel tubes would only occupy roughly ⅓ or 1/π of that two (2) m², or less of the chamber floor area.

Thus, it should be appreciated that having pores 16 distributed across the entire sidewall of the gas tubes allows for effective gas release over a relatively small portion of the base surface of the chamber. Such a configuration leaves room on the base surface of the chamber for other uses. A more realistic arrangement of tubes 14 is depicted in FIG. 2. The tubes 14 are fit within the available areas of the base surface 6 of the chamber. This arrangement allows the tubes 14 to be positioned around other components of the chamber such as a rotating support table 20, gantry system 22, and rails 24.

Additionally, if the speed of purging is a more important consideration than the relative portion of the base surface covered by gas tubes 14, then additional gas tubes can be provided in the chamber to achieve faster purging, while still assuring that the purging gas enters the chamber 2 in a laminar flow. In addition to a single layer of substantially parallel gas tubes 14, multiple vertical layers of gas tubes may also be used along the base surface of the chamber.

The gas delivery and purging tubes 14 having pores 16 distributed across the entire surface area of the sidewall can allow for the introduction of purging gas at a lower pressure as compared to conventional techniques, which can very favorably make the gas flow or delivery into the chamber in a very laminar, non-turbulent manner, which in turn generally results in the use of a smaller volume of gas needed to sufficiently purge the chamber. For example, with purging gas tubes having open cell porous sidewalls, purging gas pressure as low as 10-25 psi can be effective, whereas conventional techniques typically involve gas pressures of 30-50 psi. The relatively low pressures allow for a simplified system for introducing the purging gas as compared to a higher pressure delivery system. In one example, the purging of a two m³ chamber with a single layer of fifteen parallel gas purging tubes fed with purging gas at 25 psi could achieve a purity level of less than 50 ppm of the contamination gases in roughly 90 seconds. Lower pressures can be an effective technique to reduce the amount of purging gas used. In another example, with the purging gas fed in at 20 psi, the total amount of gas needed to sufficiently purge was only twice the volume of the chamber 2 and reached the desired purity level within 5 minutes. Increasing the number of layers of parallel purging gas tubes can also decrease the time needed to reach the desired purity level.

In practice, constraints of the additive manufacturing chamber may limit or constrain the layout of the gas tubes 14 of the gas delivery and purging device 2. Gas tubes arranged substantially parallel to each other might not be possible in some situations. However, with flexible polymer based gas tubing the tubes 14 can be easily configured in a wide variety of shapes and sizes, including being disposed around any intervening or disruptive features of the manufacturing chamber. As depicted in FIG. 2, the gas tubes 14 have been arranged to fit around a rotating support table 20, gantry system 22, and rails 24 of a manufacturing chamber. Such an arrangement would result in no significant increase in the purge time as compared to an arrangement with substantially parallel purging gas tubes. The large gas outlet area provided by the open cell porous sidewalls of the gas tubes 14 has a greater effect on the purging time than the arrangement of the purging gas tubes.

In some situations, arranging purging gas tubes along the base surface of the chamber might not be possible. However, using purging gas tubes having the same open cell porous configuration in other arrangements is just as effective. For example, the flexible purging gas tubes can be disposed in any desired shape size and may be supported by other structures. Some non-limiting examples include a flat coiled arrangement, a cylindrical coiled arrangement, and a conical coiled arrangement. Also, the tubes may be supported by other structures such as a cone, a cylindrical mesh basket, a wire frame. Such arrangements of the hose 14 along with any required support structures may be conveniently fitted into non-working space within the chamber. Filling any non-working space of the chamber with additional purge hoses 14 can improve the time to purge the chamber. Additionally, if space constraints within the chamber require tight windings of the purging gas tube, a smaller diameter tube can be used allow for sufficient flexibility.

Figure 4:
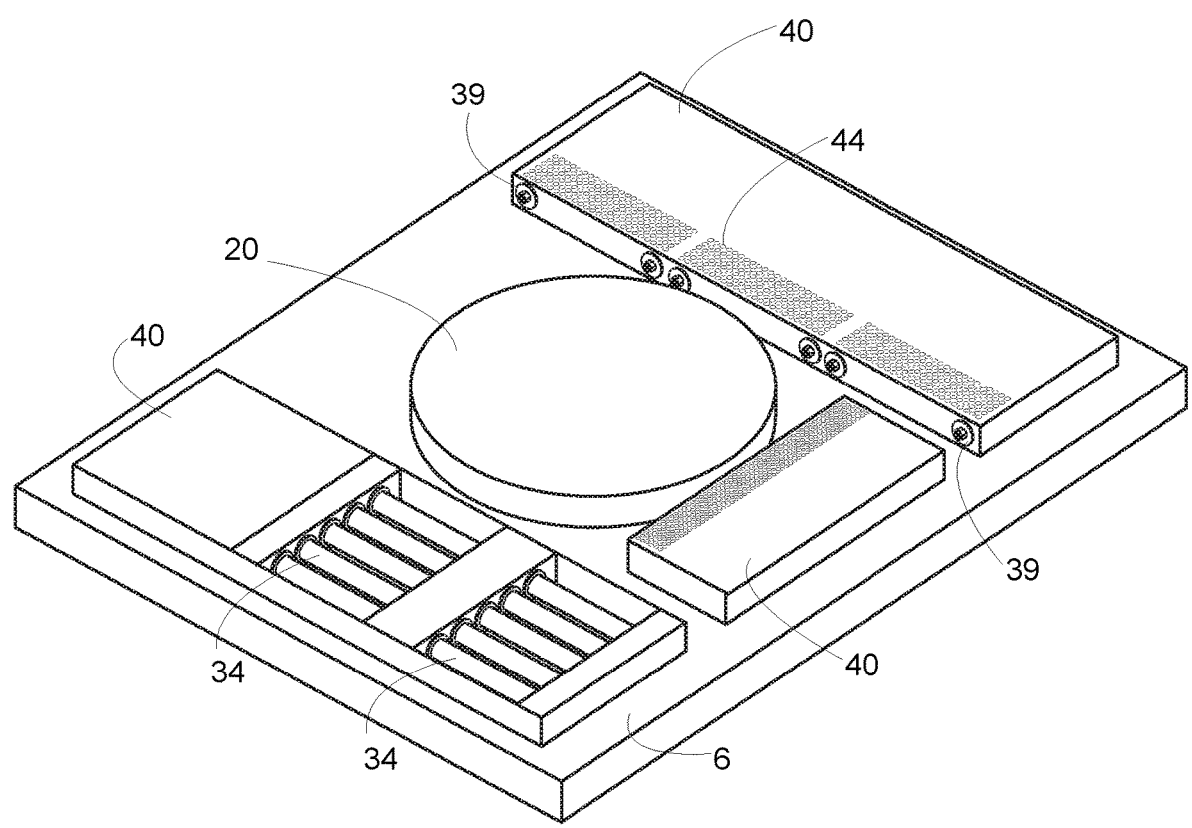
FIG. 4 is a perspective view of an additive manufacturing chamber in which a plurality of the gas delivery and purging devices of FIGS. 3A and 3B are provided.

Given the significant advantages of using purging gas tubing 14 having sidewalls with the open cell porous configuration in terms of purging time and the amount of purging gas needed, existing additive manufacturing devices could benefit from retrofitting new purging gas devices thereto. In one example such as shown in FIGS. 3A, 3B, and 4, purging gas tubes 34 are arranged in parallel with inlet ends attached to an inlet manifold 36 and outlet ends attached to an outlet manifold 38. The manifolds may have attachment points 39 along their sideways to interconnect with other manifolds. The parallel purging gas tubes and manifolds together form a retrofit purging gas device unit 40, several of which may be connected together in series, or parallel. The unit 40 can also include a rigid protective cover 42 formed of metal or other appropriate material that can include holes 44 over a portion or entirety of the surface. Such retrofit units 40 are not limited to square or rectangular designs, but can be designed in other shapes (circular, triangular, hexagonal, etc.) as needed to fit within the chamber being retrofitted.

The retrofit purging gas device unit can include fittings on the inlet and outlet manifolds that are designed to be attached to one or more adjacent retrofit purging gas device units. The units can fit together like floor tiles as space permits to cover a portion of the base surface of the additive manufacturing chamber. Moreover, units of different shapes and sizes may be used together within the same chamber so long as supply lines for the purging gas can be provided to the inlet manifolds.

Figure 5:
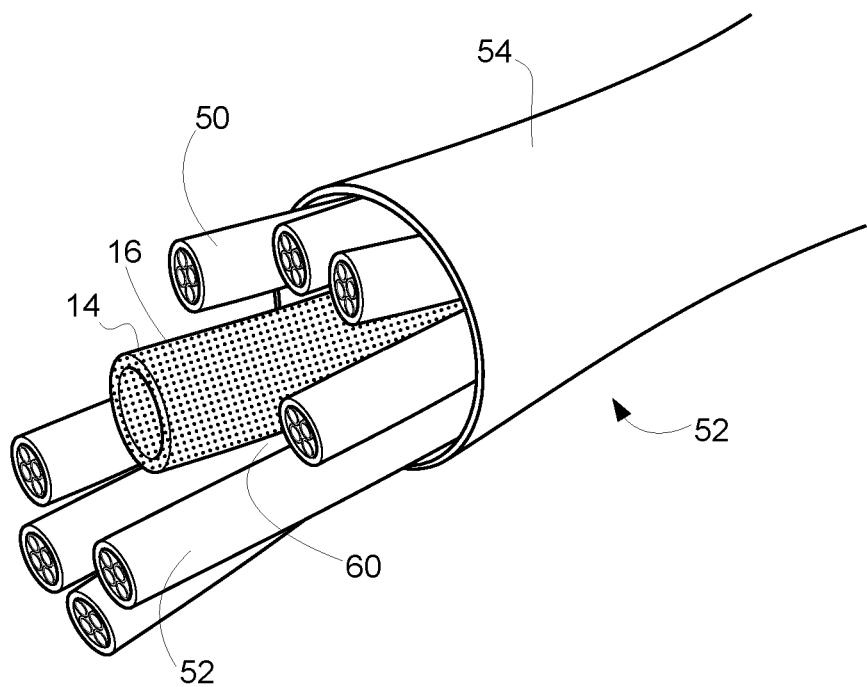
FIG. 5 is a perspective view of a cable bundle incorporating the gas delivery and purging device.
Figure 6:
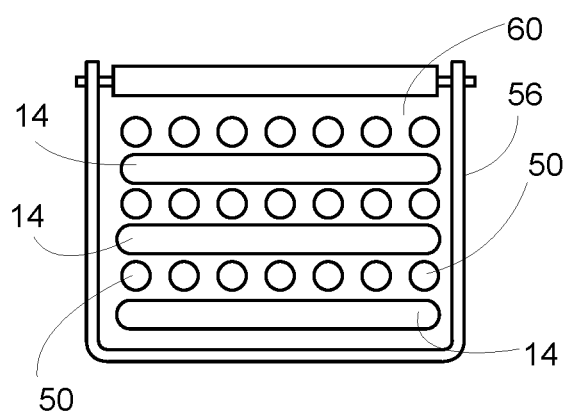
FIG. 6 is a sectional view of a cable management tray to be used within a manufacturing chamber that incorporates the gas delivery and purging device.

The process of purging a chamber can be affected by any stores of undesirable gas within the chamber that are resistant to purging. For example, the manufacturing process within the chamber may require various components and equipment. At a minimum, the manufacturing chamber will often include wires and cabling 50. The cables 50 may be organized as a bundle 52 contained within a sheath 54 as depicted in FIG. 5. While depicted as having a solid sidewall in FIG. 5, the sheath may also have an open weave configuration providing a porous sidewall. It should be apparent that the pores 16 on the hose 14 depicted in FIG. 5 are enlarged for the sake of visualization. In another example, the cables 50 may be provided within a cable management tray 56 as depicted in FIG. 6. In both examples of FIGS. 5 and 6, there are voids 60 within the wiring bundle 52 and within the cable management tray 56 that can act as stores of undesirable gases. These stores of undesirable gases negatively affect the purging process. Accordingly, the same purge tubes 14 having pores 16 along the entire sidewall can be included within the wiring bundle 52 and cable management tray 56. By including the purge tubes 14 within the wiring bundle 52, the cable management tray 56 and any other confined spaces, the purge gas can more readily reach the voids 60 and more effectively purge the chamber of the undesirable gases.

Figure 7:
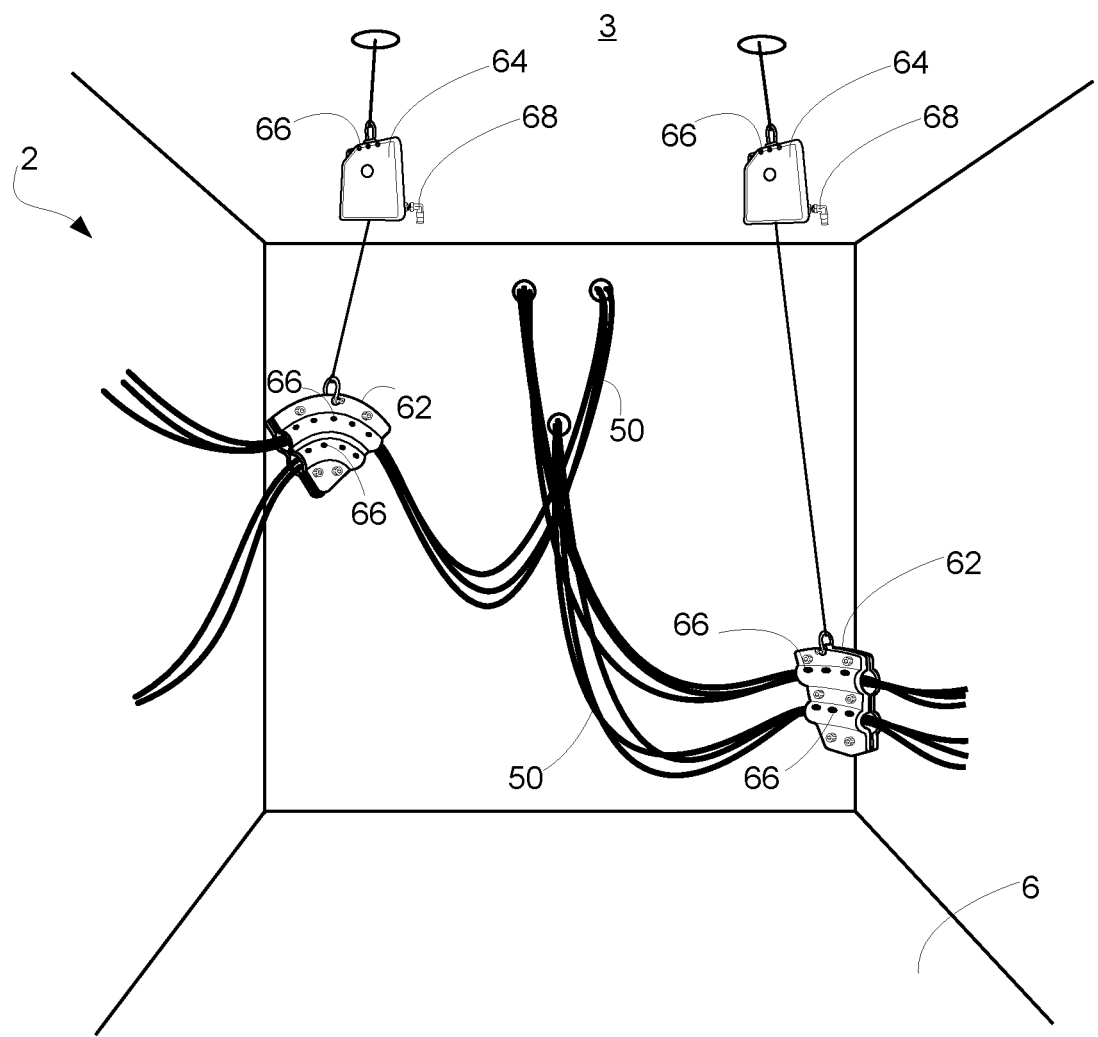
FIG. 7 is a partial perspective view of an interior of a manufacturing chamber with cable management devices to be used with the gas delivery and purging device.

Similarly, the cables 52 within the chamber 2 may require cable support devices 62 and balancers 64 attached to the chamber ceiling 3 to keep the cables from interfering with the working area within the chamber. However, the cable support devices 62 and balancers 64 can include stores of undesirable gases that negatively affect the purging process. To improve the purging process, vents 66 can be included on the cable support devices 62 and balancers 64. These vents 66 can allow for the escape of undesirable gases from within the cable support devices 62 and balancers 64. Additionally, equipment within the chamber having a case or enclosure, such as the balancers 64, can additionally benefit from a purge gas inlet 68 provided on the enclosure. Such a purge gas inlet 68 provides for an entry point into the enclosure for the purge gas. While not depicted in FIG. 7, a purge gas hose 14 could be connected to the purge gas inlet 68.

As will be understood, a gas delivery and purging device according to the present invention may be provided in a wide variety of shapes and sizes. While the foregoing description of several exemplary embodiments is provided by way of illustration and understanding of the invention, the invention is not limited to the exemplary embodiments, but may be provided in any desired shape or arrangement while still being encompassed by the present invention. Also, while the gas delivery and purging system and purging method of the present invention have been described in relation to an additive manufacturing device, again, the invention is not limited thereto, and may be used for delivering gas in any type of device requiring gas delivery, especially where it is important that the delivered gas be inputted in a laminar or substantially laminar flow.

What is claimed is:

1. A gas delivery and purging device for an additive manufacturing chamber, comprising:
   at least one gas tube having a gas inlet configured to receive a gas, a gas outlet configured to allow the gas to exit the at least one gas tube, and a sidewall which defines a shape of the at least one gas tube; and
   a source of purging gas operatively connected to the at least one gas tube for selectively delivering the purging gas to the at least one gas tube,
   wherein the gas outlet includes pores defined in substantially an entire surface area of the sidewall such that the gas passes through the pores and is thereby delivered into the additive manufacturing chamber, and
   wherein the pores of the sidewall of the at least one gas tube are arranged in an open cell configuration that is configured to allow the escape of the gas across substantially the entire sidewall surface area.

2. The gas delivery and purging device according to claim 1, wherein the at least one gas tube is a flexible polymer based tube.

3. The gas delivery and purging device according to claim 1, wherein the at least one gas tube is formed of a gardening soaker hose material.

4. The gas delivery and purging device according to claim 1, wherein the at least one gas tube includes a plurality of tube sections connected together with an inlet manifold.

5. The gas delivery and purging device according to claim 4, wherein the plurality of tube sections are arranged substantially parallel to each other and disposed along a base surface of the additive manufacturing chamber.

6. The gas delivery and purging device according to claim 4, wherein the plurality of tube sections are arranged in a vertically stacked configuration.

7. The gas delivery and purging device according to claim 4, wherein the plurality of tube sections and the inlet manifold are provided as components of a modular unit which is configured to be operatively connected to other modular units.

8. A gas delivery and purging device for an additive manufacturing chamber, comprising:
   at least one gas tube having a gas inlet configured to receive a gas, a gas outlet configured to allow the gas to exit the at least one gas tube, and a sidewall which defines a shape of the at least one gas tube; and
   a source of purging gas operatively connected to the at least one gas tube for selectively delivering the purging gas to the at least one gas tube,
   wherein the gas outlet includes pores defined in substantially an entire surface area of the sidewall such that the gas passes through the pores and is thereby delivered into the additive manufacturing chamber, and
   wherein the at least one gas tube is disposed within at least one of a cable bundle and a cable management rack.

9. An additive manufacturing system comprising: an additive manufacturing chamber and the gas delivery and purging device of claim 1.

10. A method of purging undesired gasses from an additive manufacturing chamber, including steps of:
   providing at least one purging gas tube having a purging gas inlet, a purging gas outlet, and a sidewall which defines a shape of the at least one purging gas tube within an additive manufacturing chamber; and
   supplying a purging gas into the additive manufacturing chamber through the at least one purging gas tube such that the purging gas displaces other gasses within the additive manufacturing chamber and forces the other gasses out of the chamber,
   wherein the purging gas outlet includes pores defined in substantially an entire surface area of the sidewall such that the purging gas passes through the pores into the additive manufacturing chamber.

11. The method according to claim 10, wherein in the step of supplying a purging gas into the additive manufacturing chamber through the at least one purging gas tube, the purging gas is controlled to flow into the chamber in laminar flow or substantially laminar flow.

12. The method device according to claim 10, wherein the pores of the sidewall of the at least one purging gas tube are arranged in an open cell configuration that is configured to allow the escape of the gas across substantially the entire sidewall surface area.

13. The method according to claim 10, wherein the at least one purging gas tube is a flexible polymer based tube.

14. The method according to claim 10, wherein the at least one purging gas tube is formed of a gardening soaker hose material.

15. The method according to claim 10, wherein the at least one purging gas tube includes a plurality of sections connected together with an inlet manifold.

16. The method according to claim 10, wherein the at least one purging gas tube is disposed within at least one of a cable bundle and a cable management rack.

\* \* \* \* \*